US012665140B2

(12) United States Patent
Moran et al.

(10) Patent No.: US 12,665,140 B2
(45) Date of Patent: Jun. 23, 2026

(54) MEMS SWITCH WITH HIGH OFF STATE VOLTAGE STANDOFF RATING

(71) Applicant: Menlo Microsystems, Inc., Irvine, CA (US)

(72) Inventors: Tamir Eran Moran, Petaluma, CA (US); Sanchien Hong, Placentia, CA (US); Peter Maimone, Orange, CA (US)

(73) Assignee: Menlo Microsystems, Inc., Irvine, CA (US)

( * ) Notice: Subject to any disclaimer, the term of this patent is extended or adjusted under 35 U.S.C. 154(b) by 232 days.

(21) Appl. No.: 18/503,812

(22) Filed: Nov. 7, 2023

(65) Prior Publication Data

US 2025/0149266 A1 May 8, 2025

(51) Int. Cl.

| | |
|---|---|
| ***H01H 1/00*** | (2006.01) |
| ***H01H 9/12*** | (2006.01) |
| ***H01H 59/00*** | (2006.01) |

(52) U.S. Cl.

CPC ............ *H01H 1/0036* (2013.01); *H01H 9/12* (2013.01); *H01H 59/0009* (2013.01)

(58) Field of Classification Search

CPC .. H01H 1/0036; H01H 59/00; H01H 59/0009; H01H 9/12; H01H 9/54; H01H 9/548; H01H 2059/0027; H01H 2059/0072; H01H 57/00; H01H 1/00; B81B 7/008; B81B 3/00; B81B 3/0018; B81B 3/0035; B81B 3/004; B81B 2203/00; B81B 2203/0118; B81B 2203/0136; B81B 2201/01; B81B 2201/014; B81B 2203/0315; B81B 2203/04; B81C 2203/00; B81C 2203/01; B81C 2203/0015; B81C 2203/00365; B81C 2203/00476; B81C 2203/00619; B81C 2203/00626; B81C 2203/00666; B81C 2201/0109;

(Continued)

(56) References Cited

U.S. PATENT DOCUMENTS

| | | | |
|---|---|---|---|
| 11,139,134 B2 | 10/2021 | Schepens et al. |
| 2010/0061024 A1 | 3/2010 | Premerlani et al. |

(Continued)

FOREIGN PATENT DOCUMENTS

| | | |
|---|---|---|
| EP | 2713379 A1 | 4/2014 |

*Primary Examiner* — Anthony R Jimenez

(74) *Attorney, Agent, or Firm* — Hamilton, Brook, Smith & Reynolds, P.C.

(57) ABSTRACT

A microelectromechanical system (MEMS) switch apparatus for handling input voltages higher than a standoff voltage of each MEMS switch in the MEMS switch apparatus may comprise at least one pair of MEMS switches. Each pair of MEMS switches may comprise a first MEMS switch and a second MEMS switch electrically coupled to the first MEMS switch at a midpoint. The first and second MEMS switches may be arranged in a back-to-back configuration. Each pair of MEMS switches may further comprise an input electrically coupled to the first MEMS switch, an output electrically coupled to the second MEMS switch, at least one input component electrically coupled across the first MEMS switch from the input to the midpoint, and at least one output component electrically coupled across the second MEMS switch from the midpoint to the output.

20 Claims, 6 Drawing Sheets

(58) Field of Classification Search
CPC ...... B81C 2201/013; B81C 2201/0167; B81C 2201/017; B81C 2203/0136; B81C 2203/0172; B81C 1/00; B81C 1/00015; B81C 1/00119; B81C 1/00182
USPC .................................................. 200/600, 514
See application file for complete search history.

(56) References Cited

U.S. PATENT DOCUMENTS

| | | | | |
|---|---|---|---|---|
| 2012/0249261 | A1 | 10/2012 | Aimi et al. | |
| 2014/0305777 | A1* | 10/2014 | Aimi | B81B 7/008 200/181 |
| 2020/0343067 | A1 | 10/2020 | Schepens et al. | |

* cited by examiner

MEMS SWITCH WITH HIGH OFF STATE VOLTAGE STANDOFF RATING

BACKGROUND

A typical microelectromechanical system (MEMS) switch is made to close by an electrostatic force generated when voltage is applied to a control terminal. Unfortunately, the switch can also close if a sufficiently large voltage is applied to its input terminal. The voltage level at which this unintended actuation occurs is called the standoff voltage, and it sets the upper limit on the signal levels that can be applied to the switch. Increasing the standoff voltage of a MEMS switch may require redesigns that are not practical. In situations in which the input voltage is expected to be greater than the switch's standoff voltage, there is a need for alternative solutions.

SUMMARY

The embodiments described herein are directed to a microelectromechanical system (MEMS) switch system that comprises two or more individual MEMS switches. The MEMS switches are arranged such that the MEMS switch system can withstand a standoff voltage (VSO) greater than the VSO of any one constituent MEMS switch.

In one aspect, the invention may be a microelectromechanical system (MEMS) apparatus for handling an input voltage higher than a standoff voltage of a MEMS switch in the MEMS apparatus. The MEMS apparatus may comprise at least one pair of MEMS switches. Each pair of MEMS switches may comprise a first MEMS switch and a second MEMS switch electrically coupled to the first MEMS switch at a midpoint. The first and second MEMS switches may be arranged in a back-to-back configuration. The MEMS apparatus may further comprise an input electrically coupled to the first MEMS switch, an output electrically coupled to the second MEMS switch, at least one input component electrically coupled across the first MEMS switch from the input to the midpoint, and at least one output component electrically coupled across the second MEMS switch from the midpoint to the output.

In an embodiment, at least one of the at least one input component or the at least one output component may comprise a passive component. Each of the at least one input component and the at least one output component comprises a passive component. At least one of the at least one input component or the at least one output component may comprise a capacitor. Each of the at least one input component and the at least one output component may comprise a capacitor.

The capacitance of the first input component may be four times the capacitance of the second input component and the capacitance of the first output component may be two times the capacitance of the second output component. The second input component may have the same capacitance as the second output component, the third input component may have twice the capacitance as the second input component, and the third output component may have four times the capacitance as the second output component.

At least one of the at least one input component or the at least one output component may comprise a resistor. Each of the at least one input component and the at least one output component may comprise a resistor. At least one of the at least one input component or the at least one output component may comprise a resistor and a capacitor. Each of the at least one input component and the at least one output component may comprise a resistor and a capacitor. Two or more pairs of MEMS switches may be electrically connected in series. In an embodiment, three pairs of MEMS switches may be electrically connected in series. At least one of the at least one pair of MEMS switches may be electrically coupled to a mode control switch.

Each of the at least one pair of MEMS switches may be electrically coupled to a mode control switch. In a first configuration, the mode control switch may be open and each of the at least one pair of MEMS switches is not electrically coupled to ground. In a second configuration, the mode control switch may be closed and each of the at least one pair of MEMS switches is electrically coupled to ground.

In another aspect, the invention may be a method of accommodating an input voltage that is higher than a standoff voltage of a microelectromechanical system (MEMS) apparatus. The method may comprise providing the MEMS apparatus comprising at least one pair of MEMS switches. Each pair of MEMS switches may comprise a first MEMS switch, and a second MEMS switch electrically coupled to the first MEMS switch at a midpoint. The first and second MEMS switches may be arranged in a back-to-back configuration. Each pair of MEMS switches may comprise an input electrically coupled to the first MEMS switch, an output electrically coupled to the second MEMS switch, at least one input component electrically coupled across the first MEMS switch from the input to the midpoint, and at least one output component electrically coupled across the second MEMS switch from the midpoint to the output. The method may further comprise distributing the input voltage from the input of a first pair of MEMS switches to an output of a last pair of MEMS switches.

The method may further comprise coupling the at least one pair of MEMS switches to a mode control switch. The method may further comprise implementing (i) a first configuration in which the mode control switch is open and each of the at least one pair of MEMS switches is not electrically coupled to ground, or (ii) a second configuration in which the mode control switch is closed and each of the at least one pair of MEMS switches is electrically coupled to ground. The method may further comprise electrically coupling two or more pairs of MEMS switches in series.

In another aspect, the invention may comprise a microelectromechanical system (MEMS) apparatus for handling an input voltage higher than a standoff voltage of a MEMS switch in the MEMS system. The MEMS apparatus may comprise two or more MEMS switches electrically connected in series from an apparatus input to an apparatus output. For each of the two or more MEMS switches, a component may be attached across the MEMS switch such that the components are connected in series from the apparatus input to the apparatus output, and such that the input voltage is distributed across the components.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Devices, systems, and methods described herein involve a dual mode MEMS system comprising MEMS switches that can safely withstand input voltages in excess of the standoff voltage without self-actuation while operating with a standard gate control voltage level.

Aspects of inventive concepts herein involve using several switch elements in series and distributing the input voltage across the switch elements, so that no one element in the series architecture which has proven effective in allowing the use of higher input voltages and preventing the MEMS switches from closing (actuating). Such approaches do not require a redesign of the basic switch elements and do not affect the control voltage for normal operation. In some embodiments, a secondary control signal may be used to set the switch to either a high input voltage handling mode or to a normal operation mode.

In some embodiments, aspects of inventive concepts herein involve a single-pole single throw switch comprising three back-to-back switch elements that are connected together in a series configuration, a parallel divider network, and a mode control feature. While the standoff voltage of a single MEMS element remains, for example, 150V, devices and systems described herein can withstand an input voltage of up to 440 volts peak-to-peak (Vpp) in the OFF state, and pass, for example, DC—18 GHz in the ON state.

Figure 1A:
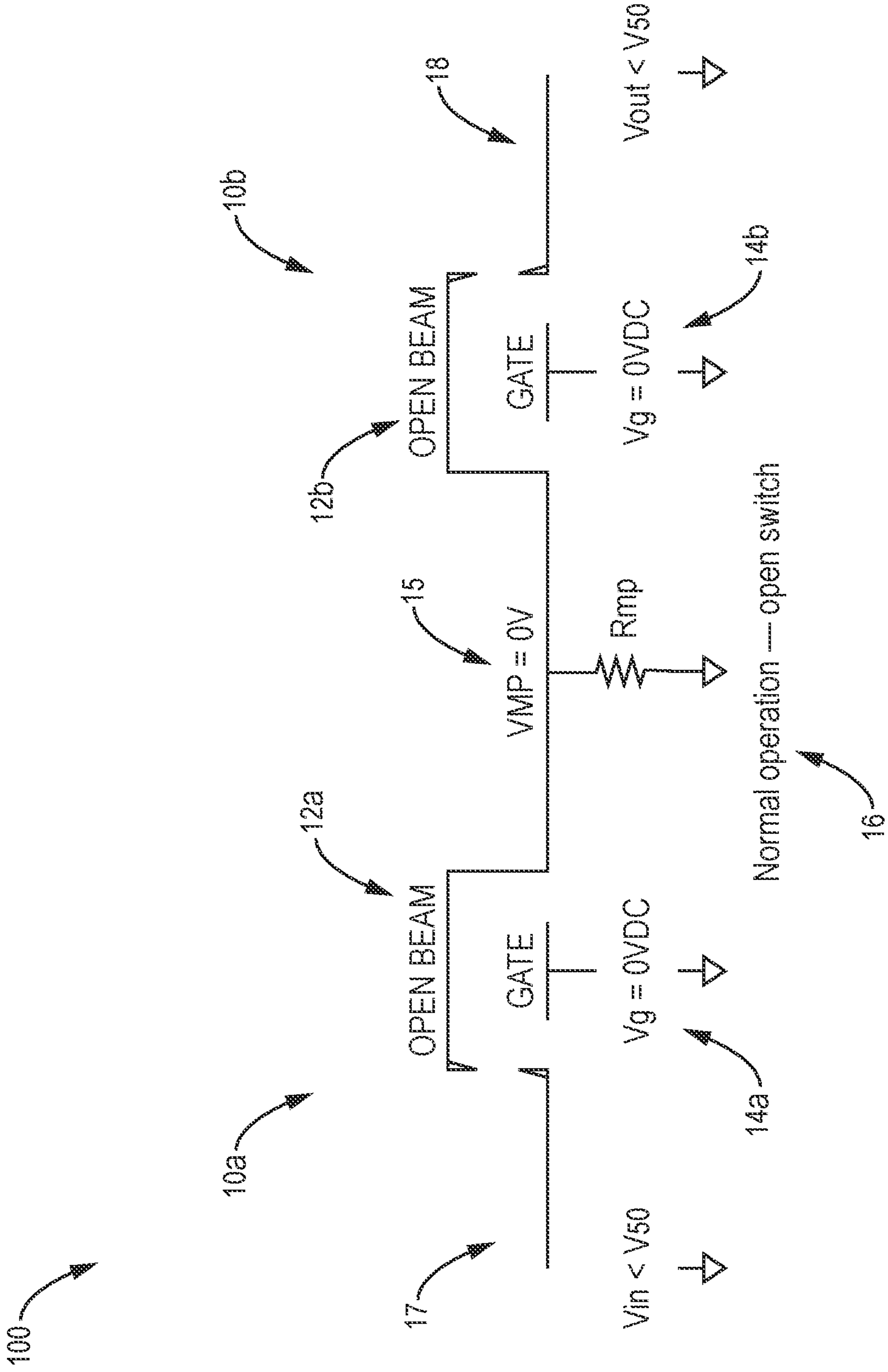
FIG. 1A shows a pair of back-to-back MEMS switches operating normally in an open (OFF) configuration.

FIG. 1A shows a pair 100 of back-to-back MEMS switches 10*a*, 10*b* operating normally in an open (OFF) configuration. The switches 10*a*, 10*b* are controlled by an electrostatic force that pulls their beams 12*a*, 12*b* down when a gate voltage (Vg) is applied to a control terminal (gate) 14*a*, 14*b*. In some embodiments, such as the one shown in FIG. 1A, the gate voltage required to close the beams is 90V. In some embodiments, the gate voltage is less than 90V. In some embodiments, the gate voltage is more than 90V.

The standoff voltage ($V_{SO}$) of a MEMS switch is the maximum voltage that can be applied to the input of the switch while the switch is in the off state (i.e., open circuit). Exceeding $V_{SO}$ risks electrostatically closing the switch in an uncontrolled manner. $V_{SO}$ may be determined by, for example, the geometry of the switch (among other physical parameters associated with the switch). $V_{SO}$ defines a limit to the maximum input voltage that can be applied to a MEMS switch while the switch is in the off state. The standoff voltage may be increased by, for example, changing the geometry of the switch. However, changing the geometry (or other parameters) of the switch may require a substantial effort, and may result in a higher (possibly undesirable) gate control voltage.

In an example embodiment, such as the one shown in FIG. 1A, the standoff voltage is approximately 150V. In other embodiments the standoff voltage may be more or less than 150V.

In the situation shown in FIG. 1A the input voltage (Vin) and the output voltage (Vout) are less than $V_{SO}$. In the situation shown in FIG. 1A the gate voltage (Vg) at each switch 10*a*, 10*b* is zero. In this configuration, both switches 10*a*, 10*b* are in the open state.

Figure 1B:
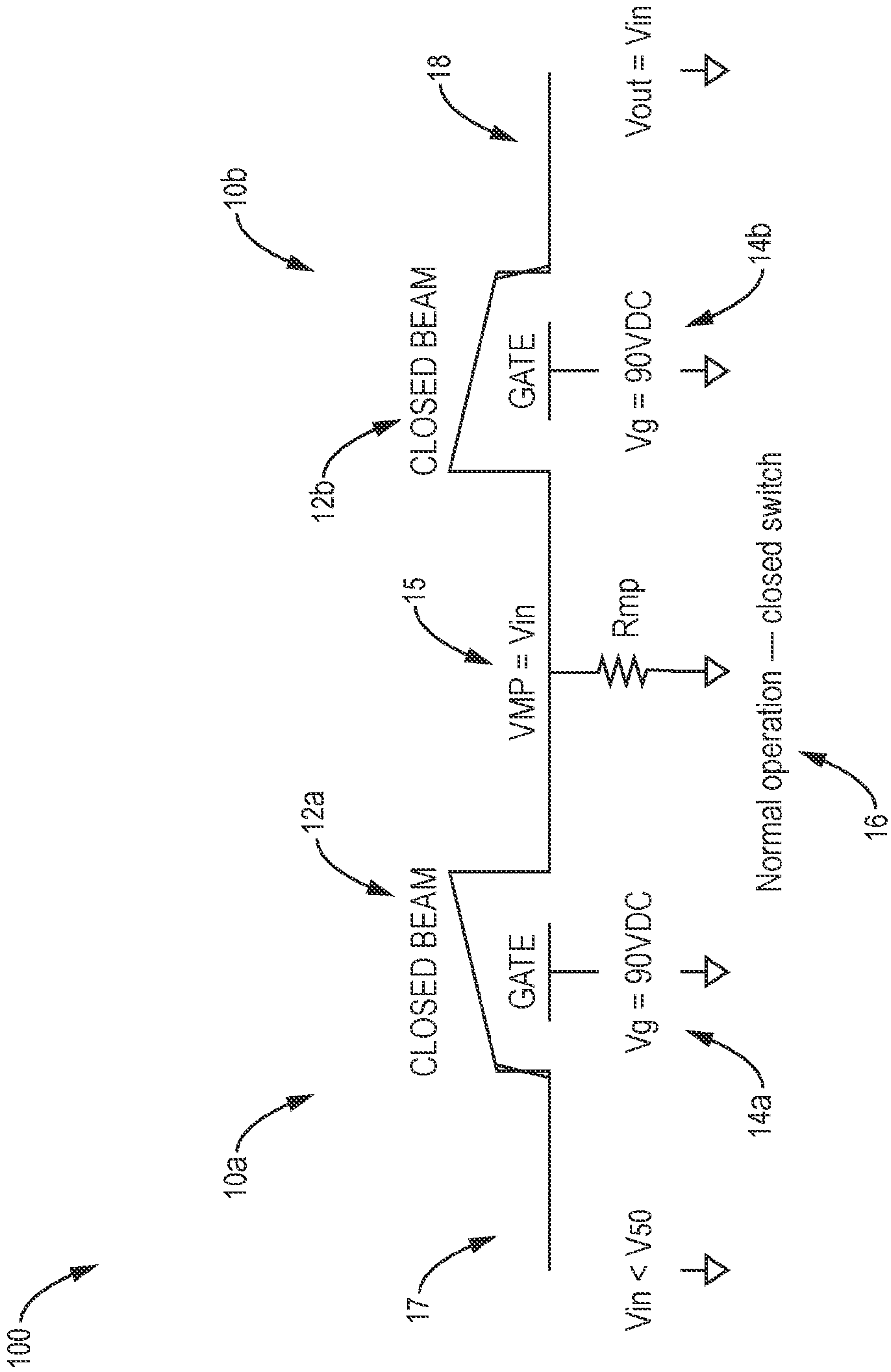
FIG. 1B shows a pair of back-to-back MEMS switches operating normally in a closed (ON) configuration.

FIG. 1B shows a pair 100 of back-to-back MEMS switches 10*a*, 10*b* operating normally in a closed (ON) configuration. In FIG. 1B, Vin and Vout are less than $V_{SO}$. IN FIG. 1B Vg for each switch 10*a*, 10*b* is at 90 Vdc, which is above the switch pull-in voltage so each switch 10*a*, 10*b* is closed.

Figure 1C:
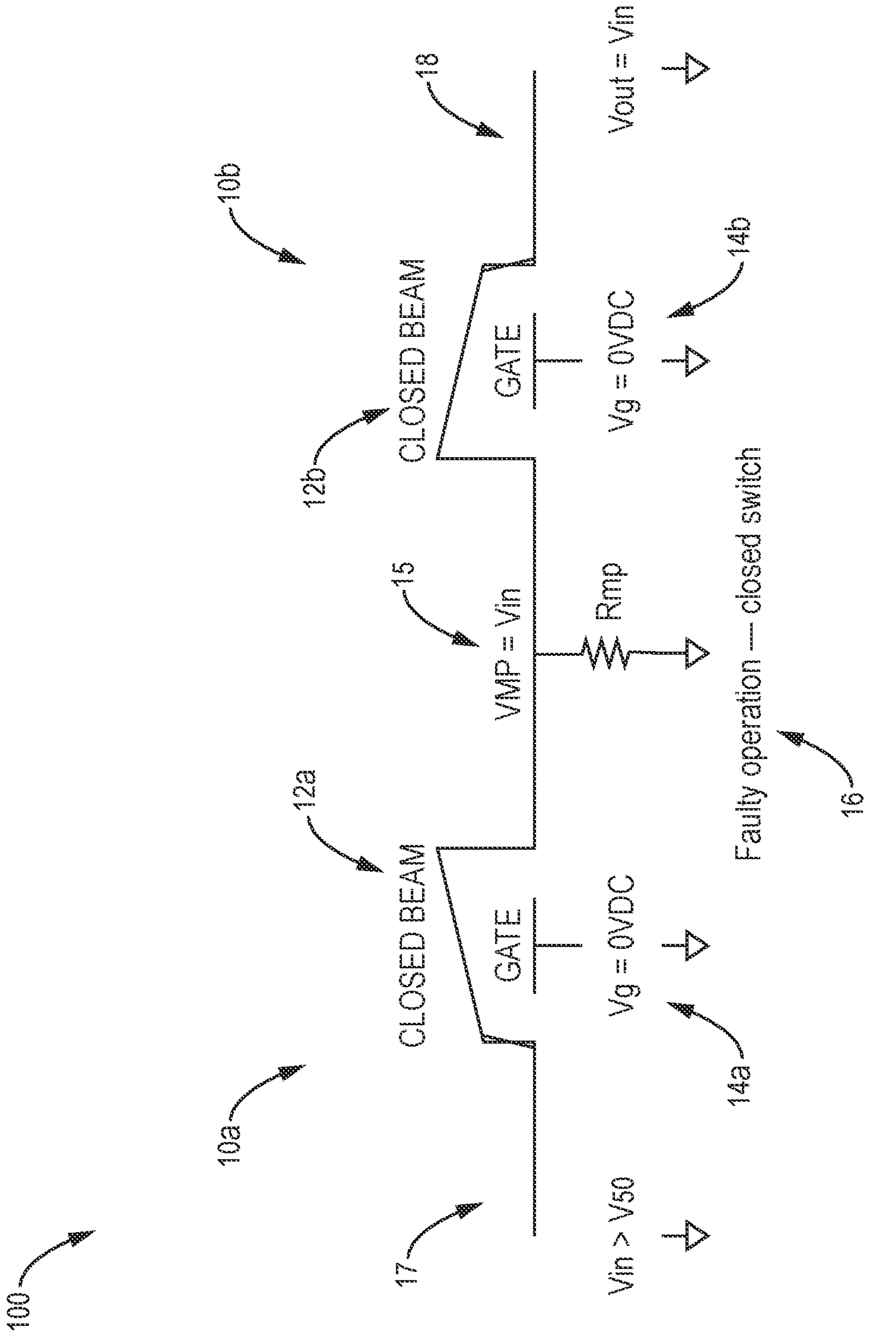
FIG. 1C shows a pair of back-to-back MEMS switches during faulty operation in a closed (ON) configuration.

FIG. 1C shows a pair 100 of back-to-back MEMS switches 10*a*, 10*b* during faulty operation in a closed (ON) configuration. In this third situation, each Vg is zero, so the switch is intended to be open; however, the input voltage (Vin) is greater than the standoff voltage ($V_{SO}$), so the switch is closed when it is intended to be open. Devices, systems, and methods described herein address the problem posed in this third situation.

Figure 2:
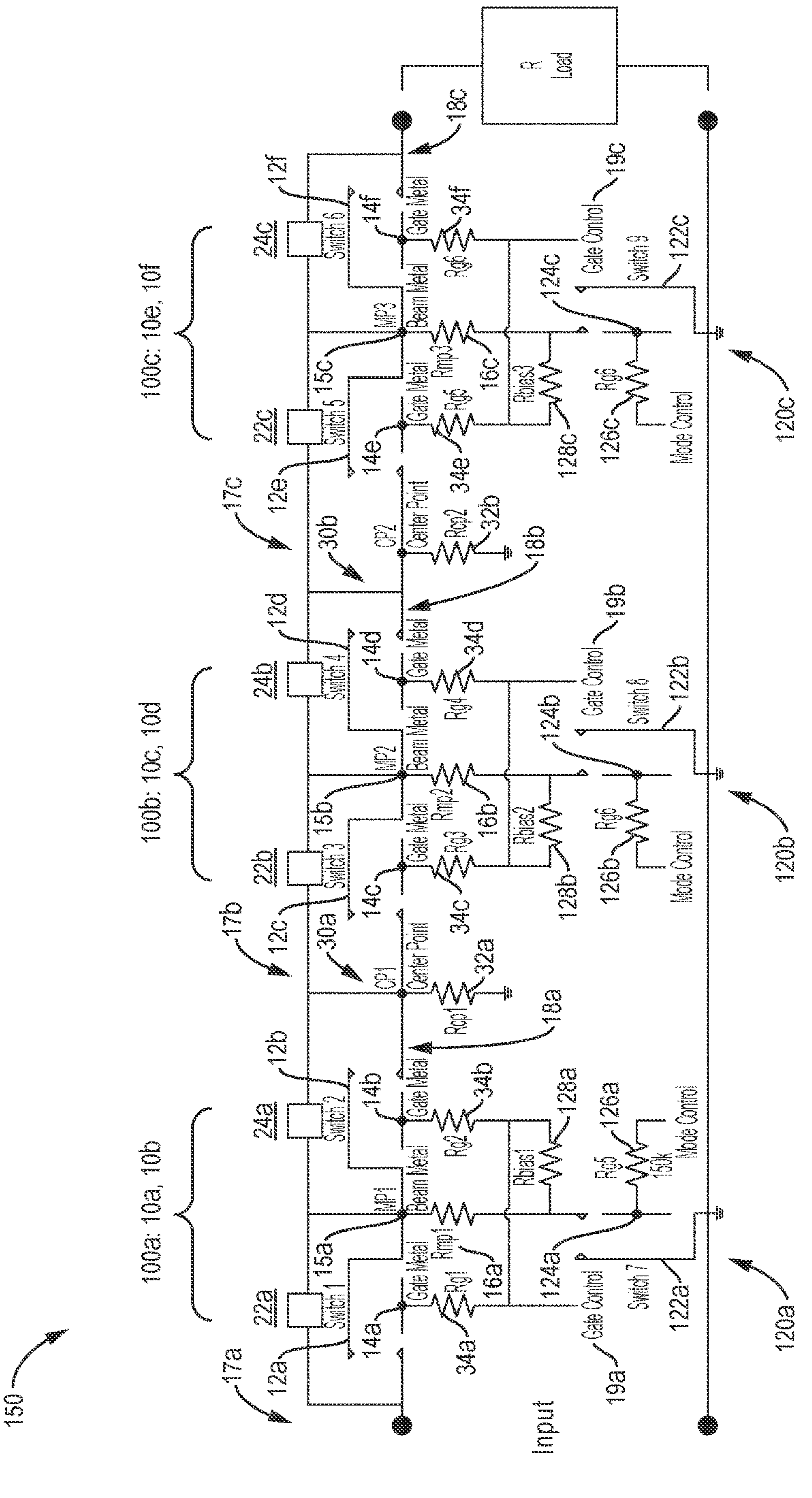
FIG. 2 is a schematic view of an embodiment of a MEMS system comprising three pairs of MEMS switches that is configured to handle input voltages (Vin) that are greater than a standoff voltage (Vso) of an individual MEMS switch, in accordance with aspects of inventive concepts.

FIG. 2 is a schematic view of an example embodiment of a MEMS system 150 comprising three series-connected pairs 100*a*-100*c* of MEMS switches 10*a*-10*f* that is configured to handle values of Vin that are greater than the $V_{SO}$ of an individual MEMS switch 10, in accordance with aspects of inventive concepts. In some embodiments, such as the one shown in FIG. 2, each individual MEMS switch 10 has a standoff voltage ($V_{SO}$) of 150 V. Consequently, to address the problem described in connection with FIG. 1A-1C, the MEMS system 150 of FIG. 2 is configured to handle input voltages of at least 450 V.

In the example embodiment shown in FIG. 2, the MEMS system 150 comprises three pairs 100*a*-100*c* of back-to-back MEMS switches 10*a*-10*f*. In alternative embodiments, the MEMS system 150 comprises a different number of pairs 100 of MEMS switches 10. Each switch 10 shown in FIG. 2 comprises a beam 12 and gate 14, as described in connection with FIGS. 1A-1C. As used herein, a pair 100 of switches 10 is considered to be back-to-back when the beam 12 of a first switch 10 is electrically coupled to a beam 12 of a second switch 10 for each of the following configurations: the first switch 10 is open and the second switch 10 is open; the first switch 10 is closed and the second switch 10 is closed; the first switch 10 is open and the second switch 10 is closed; the first switch 10 is closed and the second switch 10 is open.

In some embodiments, each pair 100 of MEMS switches is electrically coupled to a neighboring pair 100 of MEMS switches 10 at a center point 30. In the embodiment shown in FIG. 2, there are two center points 30*a*, 30*b*. In alternative embodiments with a different number of pairs 100 of MEMS switches 10 there may be a different number of center points 30.

In some embodiments the center points 30 are coupled to a center point resistor 32. In the embodiment shown in FIG. 2, the first center point 30*a* is coupled to a first center point resistor 32*a*.

In some embodiments, at least one of the center point resistors 32 are electrically coupled to ground. In the example embodiment shown in FIG. 2, both center point resistors 32*a*, 32*b* are electrically coupled to ground. In alternative embodiments, a different number of center point resistors may be electrically coupled to ground.

In some embodiments, such as the example shown in FIG. 2, each pair 100 of MEMS switches 10 comprises a first MEMS switch 10 (10*a*, 10*c*, 10*e*); a second MEMS switch 10 (10*b*, 10*d*, 10*f*) that is electrically coupled to the first MEMS switch 10 (10*a*, 10*c*, 10*e*) at a midpoint 15 (15*a*, 15*c*, 15*e*), the first and second MEMS switches 10 being arranged in a back-to-back configuration; an input 17 (17*a*, 17*b*, 17*c*) electrically coupled to the first MEMS switch 10; an output 18 (18*a*, 18*b*, 18*c*) electrically coupled to the second MEMS switch 10; at least one input component 22 (22*a*, 22*b*, 22*c*) electrically coupled across the first MEMS switch from the input 17 to the midpoint 15; and at least one output component 24 (24*a*, 24*b*, 24*c*) electrically coupled across the second MEMS switch 10 from the midpoint 15 to the output 18.

In some embodiments, the MEMS system 150 comprises a system input and a system output. In some embodiments, the system input corresponds to the input 17 of the first pair 100 of MEMS switches 10 in the MEMS system 150. In some embodiments, the system output corresponds to the output 18 of the last pair 100 of MEMS switches 10 in the MEMS system 150.

In the example embodiment shown in FIG. 2 the MEMS system 150 comprises three pairs 100 (100*a*, 100*b*, 100*c*) of MEMS switches 10*a*-10*f*. As a result, in this example embodiment, the input 17*a* of the first pair 100*a* is the system input and the output 18*c* of the third pair 100*c* is the system output.

In some embodiments, such as the one shown in FIG. 2, the MEMS system 150 comprises three pairs 100*a*-100*c* of MEMS switches 10*a*-10*f*. In alternative embodiments, the MEMS system 150 may comprise a different number of MEMS switches 10.

In some embodiments, such as the example shown in FIG. 2, each pair 100 of MEMS switches 10 comprises one input component 22*a*-22*c* electrically coupled across the first MEMS switch 10 from the input 17 to the midpoint 15. In some embodiments, one or more of the MEMS switches 10 may comprise a different number of input components 22. In some embodiments, each input component 22 comprises a passive component. In alternative embodiments, one or more of the input components may not comprise a passive component. In some embodiments, each input component comprises a capacitor. In some embodiments, one or more of the input components 22 may not comprise a capacitor. In some embodiments, one or more of the input components 22 may comprise a resistor. In some embodiments, one or more of the input components 22 may comprise a resistor and a capacitor arranged in parallel or in series.

In some embodiments, such as the example shown in FIG. 2, each pair 100 of MEMS switches 10 comprises one output component 24. In alternative embodiments, one or more of the MEMS switches 10 may comprise a different number of output components 24. In some embodiments, such as the one shown in FIG. 2, each output component 24 comprises a passive component. In alternative embodiments, one or more of the output components 24 may not comprise a passive component. In some embodiments, such as the one shown in FIG. 2 each output component 24 comprises a capacitor. In alternative embodiments, one or more of the output components 24 may not comprise a capacitor. In alternative embodiments, one or more of the output components 24 may comprise a resistor. In alternative embodiments, one or more of the output components 24 may comprise a resistor and a capacitor arranged in parallel or in series.

In some embodiments, at least one of the switches 10 comprises a gate resistor 34 electrically coupled to the gate 14. In some embodiments, such as the one shown in FIG. 2, each of the switches 10*a*-10*f* comprises a gate 14 and a corresponding gate resistor 34*a*-34*f*.

In some embodiments, such as the one shown in FIG. 2, each pair 100*a*-100*c* of MEMS switches 10*a*-10*f* comprises a midpoint 15*a*, 15*b*, 15*c* and at least one corresponding midpoint resistor 16*a*, 16*b*, 16*c*.

In some embodiments, such as the one shown in FIG. 2, each midpoint resistor 16*a*, 16*b*, 16*c* may be coupled to ground in order to prevent the midpoint 15 from floating when the corresponding switch 10 is opened. It is important to avoid such floating midpoints 15 because undetermined electrical charge can damage a MEMS switch 10 during actuation. The grounded midpoint resistors 16*a*, 16*b*, 16*c* also limit the maximum input voltage to $V_{SO}$.

Allowing the midpoint(s) 15*a*, 15*b*, 15*c* to float when the switch is OFF and providing a path from the midpoint(s) 15 to ground before actuation allows the MEMS system 150 to handle higher input voltages (Vin) than $V_{SO}$, but safely actuate when a specified "actuate" control voltage is applied to the gate.

In some embodiments, the MEMS system 150 comprises at least one mode control switch 120 electrically coupled to a pair of MEMS switches 100. In the embodiment shown in FIG. 2, each pair 100*a*-100*c* of MEMS switches 10*a*-10*f* is electrically coupled to a corresponding mode control switch 120*a*-120*c*.

In some embodiments, at least one of the mode control switches 120 comprises a MEMS switch. In the embodiment shown in FIG. 2, each of the mode control switches 120*a*-120*c* comprises a MEMS switch. Each mode control switch 120*a*-120*c* shown in FIG. 2 comprises a beam 122 and gate 124 (124*a*-*c*), as described in connection with FIGS. 1A-1C.

In some embodiments, at least one of the mode control switches 120 includes a gate 124 and a mode control resistor 126 that is electrically coupled to the gate 124. In the embodiment shown in FIG. 2 each of the mode control switches 120 comprises a gate 124*a*-124*c* and a mode control resistor 126*a*-126*c* that is electrically coupled to the corresponding gate 124*a*-124*c*.

In some embodiments, an output of at least one mode control switch 120 is electrically coupled to a bias resistor 128. In the embodiment shown in FIG. 2, the output of each mode control switch 120*a*-120*c* is electrically coupled to a bias resistor 128*a*-128*c*. Each bias resistor is also coupled to the gate control node 19*a*, 19*b*, 19*c*. For example, bias resistor 128*a* is coupled to gate control 19*a*, which provides a path from the gate 14*a* to ground through resistors 34*a*, 128*a*, and switch 120*a* when switch 120*a* is actuated.

When the mode control switches 120*a*-120*c* are in an open (not actuated) state, the MEMS system 150 can withstand input voltages above $V_{SO}$ because the MEMS switch pairs 100*a*-100*c* all have a floating midpoint 15*a*-15*c* and the input voltage gets distributed across the input components 22 and output components 24. With the mode switches 120*a*-120*c* closed, the MEMS switches 10*a*-10*f* act as an ordinary MEMS switch combination (low loss, high linearity, but can't handle an input voltage above the standoff voltage).

Figure 3:
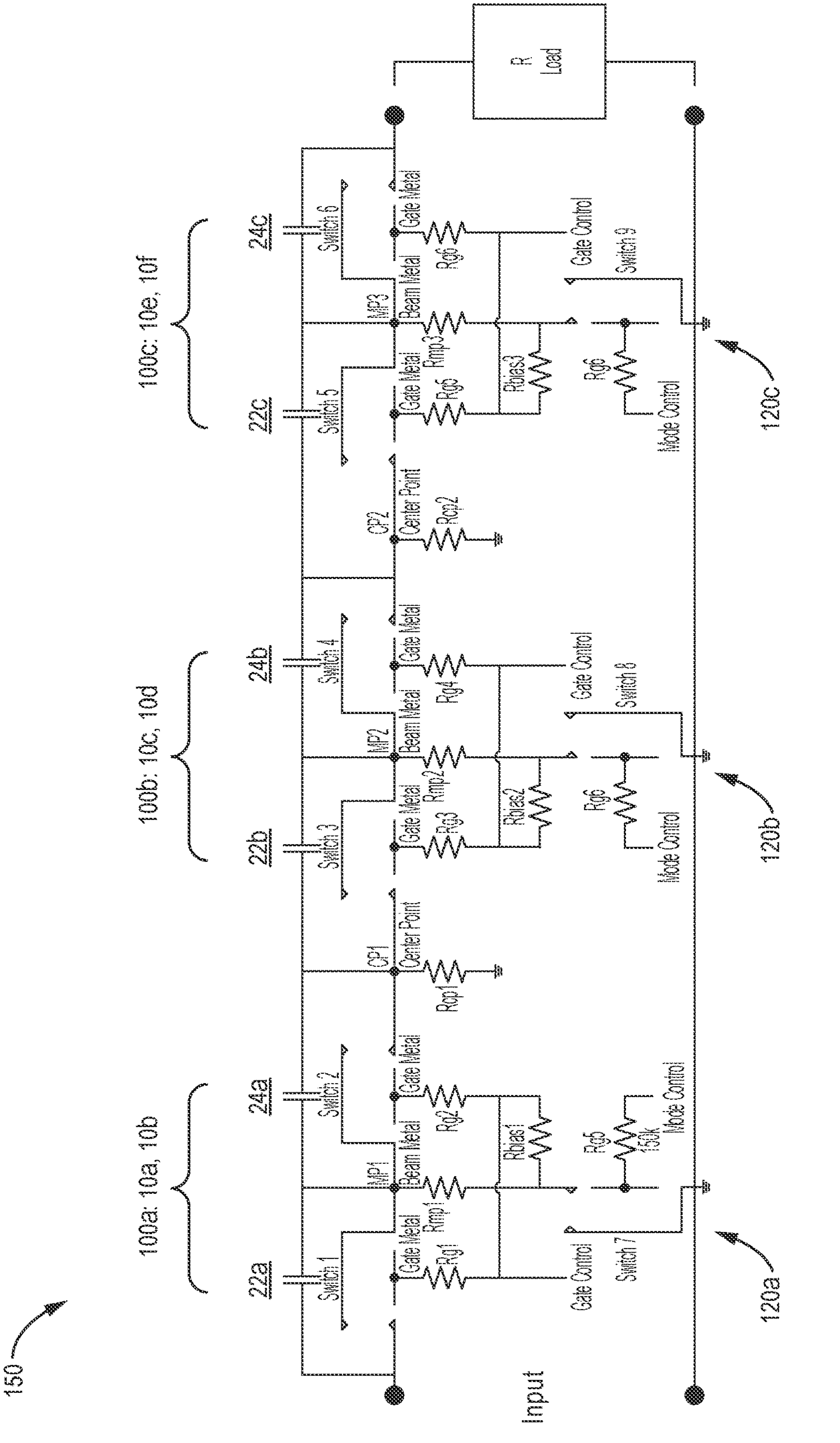
FIG. 3 is a schematic of an embodiment of the MEMS system of FIG. 2 in which each of the input components comprises a capacitor and each of the output components comprises a capacitor, in accordance with aspects of inventive concepts.

FIG. 3 is a schematic of an example embodiment of the MEMS system 150 of FIG. 2 in which each of the input components 22*a*-22*c* comprises a capacitor and each of the output components 24*a*-24*c* comprises a capacitor, in accordance with aspects of inventive concepts. It should be understood that the components 22*a*, 22*b*, 22*c*, 24*a*, 24*b*, 24*c* may all be equal in capacitance value, each component may have a different capacitance value, or the components 22*a*, 22*b*, 22*c*, 24*a*, 24*b*, 24*c* may have any combination of capacitance values. In alternative embodiments, each input component 22 comprises a different number of capacitors. In some embodiments, one or more of the input components 22 may not comprise a capacitor. In alternative embodiments, one or more of the input components 22 may comprise a resistor. In alternative embodiments, one or more of the input components 22 may comprise a resistor and a capacitor arranged in series or in parallel.

In alternative embodiments, each output 24 component comprises a different number of capacitors. In some embodiments, one or more of the output components 24 may not comprise a capacitor. In alternative embodiments, one or more of the output components 24 may comprise a resistor. In alternative embodiments, one or more of the output components 24 may comprise a resistor and a capacitor.

Figure 4:
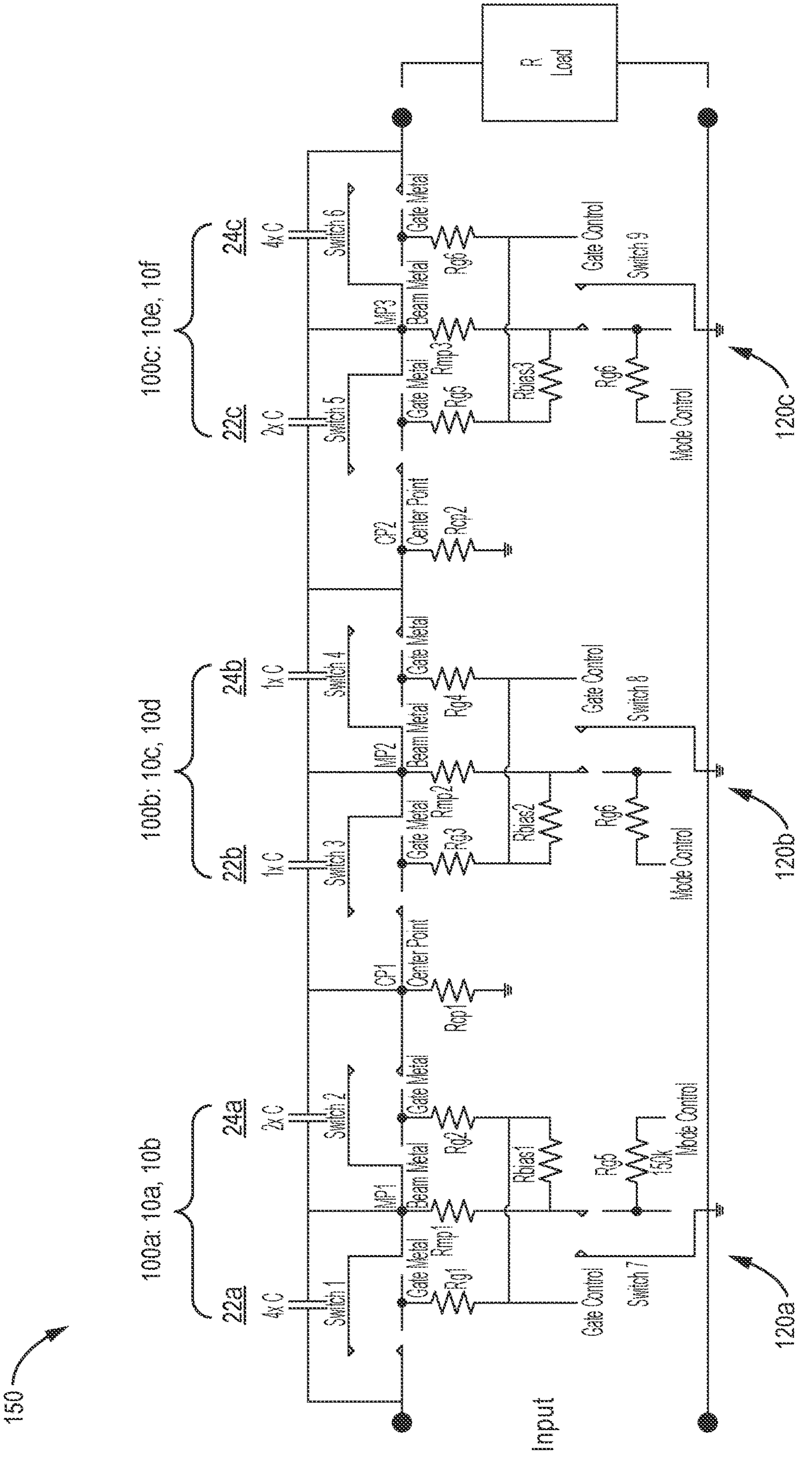
FIG. 4 is schematic of an embodiment of the MEMS system of FIG. 2 in which each of the input components comprises a capacitor and each of the output components comprises a capacitor, in accordance with aspects of inventive concepts.

FIG. 4 is schematic of an embodiment of the MEMS system 150 of FIG. 2 in which each of the input components 22*a*-22*c* comprises a capacitor and each of the output components 24*a*-24*c* comprises a capacitor, in accordance with aspects of inventive concepts. In some embodiments, such as the one shown in FIG. 4 a magnitude of the capacitance at the input 22 and output 24 components is configured in a ratio of 4×, 2×, 1×, 1×, 2×, 4×. In this embodiment the capacitance of the first input component 22*a* is four times the capacitance of the second input component 22*b*. In this embodiment the capacitance of the first output component 24*a* is two times the capacitance of the second output component 24*b*. In this embodiment, the second input component 22*b* has the same capacitance as the second output component 24*b*. In this embodiment, the third input component 22*c* has twice the capacitance as the second input component 22*b*. In this embodiment, the third output component 24*c* has four times the capacitance as the second output component 24*b*. In alternative embodiments, the ratios of the capacitance between the capacitors may be different. The relationship between capacitance values of the above-referenced capacitors be used to mitigate effects of phase delay across the switches. Accordingly, any values of capacitances that mitigate effects of phase delay across the switches is within the inventive concepts described herein.

In alternative embodiments in which each of the input components and each of the output components comprises resistors, the ratio of the corresponding resistances may match the 4×, 2×, 1×, 1×, 2×, 4× configuration.

In alternative embodiments in which each of the input components and each of the output components comprise resistors and capacitors, the ratio of the corresponding capacitances of the capacitors may match the 4×, 2×, 1×, 1×, 2×, 4× configuration.

In alternative embodiments in which each of the input components and each of the output components comprise resistors and capacitors, the ratio of the corresponding resistances of the resistors may match the 4×, 2×, 1×, 1×, 2×, 4× configuration.

While example embodiments have been particularly shown and described, it will be understood by those skilled in the art that various changes in form and details may be made therein without departing from the scope of the embodiments encompassed by the appended claims.

What is claimed is:

1. A microelectromechanical system (MEMS) apparatus for handling an input voltage higher than a standoff voltage of a MEMS switch in the MEMS apparatus, the MEMS apparatus comprising:
- at least one pair of MEMS switches, each pair of MEMS switches comprising:
  - a first MEMS switch;
  - a second MEMS switch electrically coupled to the first MEMS switch at a midpoint, the first and second MEMS switches being arranged in a back-to-back configuration;
  - an input electrically coupled to the first MEMS switch;
  - an output electrically coupled to the second MEMS switch;
  - at least one input component electrically coupled across the first MEMS switch from the input to the midpoint; and
  - at least one output component electrically coupled across the second MEMS switch from the midpoint to the output.

2. The MEMS apparatus of claim 1, wherein at least one of the at least one input component or the at least one output component comprises a passive component.

3. The MEMS apparatus of claim 1, wherein each of the at least one input component and the at least one output component comprises a passive component.

4. The MEMS apparatus of claim 1, wherein at least one of the at least one input component or the at least one output component comprises a capacitor.

5. The MEMS apparatus of claim 1, wherein each of the at least one input component and the at least one output component comprises a capacitor.

6. The MEMS apparatus of claim 1, wherein a first input component capacitance is four times a second input component capacitance, a first output component capacitance is two times a second output component capacitance, the second input component capacitance is equal to the second output component capacitance, a third input component capacitance is two times the second input component capacitance, and a third output component capacitance is four times the second output component capacitance.

7. The MEMS apparatus of claim 1, wherein at least one of the at least one input component or the at least one output component comprises a resistor.

8. The MEMS apparatus of claim 1, wherein each of the at least one input component and the at least one output component comprises a resistor.

9. The MEMS apparatus of claim 1, wherein at least one of the at least one input component or the at least one output component comprises a resistor and a capacitor.

10. The MEMS apparatus of claim 1, wherein each of the at least one input component and the at least one output component comprises a resistor and a capacitor.

11. The MEMS apparatus of claim 1, wherein each of the at least one pair of MEMS switches is electrically coupled to a mode control switch.

12. The MEMS apparatus of claim 1, wherein two or more pairs of MEMS switches are electrically connected in series.

13. The MEMS apparatus of claim 12, wherein three pairs of MEMS switches are electrically connected in series.

14. The MEMS apparatus of claim 1, wherein at least one of the at least one pair of MEMS switches is electrically coupled to a mode control switch.

15. The MEMS apparatus of claim 14, wherein:
- in a first configuration, the mode control switch is open and each of the at least one pair of MEMS switches is not electrically coupled to ground; and in a second configuration, the mode control switch is closed and each of the at least one pair of MEMS switches is electrically coupled to ground.

16. A method of accommodating an input voltage that is higher than a standoff voltage of a microelectromechanical system (MEMS) apparatus, comprising:

providing the MEMS apparatus comprising at least one pair of MEMS switches, each pair of MEMS switches comprising:

a first MEMS switch;

a second MEMS switch electrically coupled to the first MEMS switch at a midpoint, the first and second MEMS switches being arranged in a back-to-back configuration;

an input electrically coupled to the first MEMS switch;

an output electrically coupled to the second MEMS switch;

at least one input component electrically coupled across the first MEMS switch from the input to the midpoint; and at least one output component electrically coupled across the second MEMS switch from the midpoint to the output;

distributing the input voltage from an input of a first pair of MEMS switches of the at least one pair of MEMS switches to an output of a last pair of MEMS switches.

17. The method of claim 16, further comprising electrically coupling two or more pairs of MEMS switches in series.

18. The method of claim 16, further comprising coupling the at least one pair of MEMS switches to a mode control switch.

19. The method of claim 18, further comprising implementing (i) a first configuration in which the mode control switch is open and each of the at least one pair of MEMS switches is not electrically coupled to ground, or (ii) a second configuration in which the mode control switch is closed and each of the at least one pair of MEMS switches is electrically coupled to ground.

20. A microelectromechanical system (MEMS) apparatus for handling an input voltage higher than a standoff voltage of a MEMS switch in the MEMS apparatus, comprising:

two or more MEMS switches electrically connected in series from an apparatus input to an apparatus output;

for each of the two or more MEMS switches, a component attached across the MEMS switch, such that the components associated with the two or more MEMS switches are connected in series from the apparatus input to the apparatus output, and such that the input voltage is distributed across the components.

* * * * *